United States Patent Office 3,723,388
Patented Mar. 27, 1973

3,723,388
PHENOXYPHTHALATE POLYESTERS
Alan Bell and Winston J. Jackson, Jr., Kingsport, Tenn.,
assignors to Eastman Kodak Company, Rochester, N.Y.
No Drawing. Filed Oct. 8, 1971, Ser. No. 187,841
Int. Cl. C08g 17/08
U.S. Cl. 260—47 C
10 Claims

ABSTRACT OF THE DISCLOSURE

Composition of matter comprising a phenoxyphthalate polyester of at least one aromatic diol, and at least in part at least one phenoxyphthalic acid. These polyesters are characterized by their reduced glass transition temperatures, thermal and oxidative stability and high oxygen indices which makes the compositions readily processable into fire-retardant plastics and fibers.

---

This invention relates to aromatic polyester compositions. More specifically, this invention relates to polyesters of phenoxyphthalic acids and aromatic diols having outstanding processability and other desirable properties such as improved flame resistance.

Polyesters of aromatic dicarboxylic acids and aromatic diols generally have high glass transition temperatures and heat distortion temperatures. Consequently, they also have high melt viscosities and require high processing and fabrication temperatures for injection molding or melt extrusion into films, fibers or other shaped objects. Most injection molding machines cannot injection mold at temperatures as high as 400° C., but many highly aromatic polyesters melt above 400° C.

Objects of the present invention, therefore, are: to reduce the glass transition and heat distortion temperatures, melt viscosities and fabrication temperatures of aromatic polyesters without appreciably decreasing the hardness, tensile strength, stiffness, elongation or impact strength.

Another object of this invention is to provide phenoxyphthalate polyesters with high thermal oxidative stability.

A further object is to provide phenoxyphthalate polyesters which exhibit outstanding fire-retardant characteristics.

Still another object of this invention is to provide aromatic polyesters which exhibit improved processability and may be formed into heat-resistant, fire-retardant plastics, fibers and other shaped objects.

Other objects will be apparent elsewhere in this specification.

These and other objects hereinafter appearing have been attained in accordance with the present invention through the discovery that aromatic polyesters derived from aromatic diols and at least one phenoxyphthalic acid or derivatives thereof are surprisingly processable when compared with other aromatic polyesters which are not derived at least in part from phenoxyphthalic acids. It has been discovered that the phenoxy group is surprisingly effective in reducing the melting points of high-melting aromatic polyesters which, because of their high melting points, cannot be fabricated into shaped articles. Furthermore, it has been discovered that the phenoxy group associated with the novel polyesters of this invention also reduces the melt viscosity of the polyesters of this invention, thereby improving their melt processability in operations such as injection molding, extrusion, and melt spinning. The reduced melt viscosity is due to the decreased glass transition temperatures of the polymers. See IUPAC International Symposium on Marcomolecular Chemistry, Structure and Properties of Polymers, Part II, Toronto, 1968, p. A8.5.

Since the phenoxy group increases the bulk of the polymer repeating unit, it was surprising to find that it actually reduced the glass transition temperature of the polymer. This was unexpected in that it is known that higher glass transition temperatures are obtained when the bulk of the repeating polymer unit is increased [see, for example, Ind. Eng. Chem. Prod. Res. Develop., 2, 246 (1963); U.S. 3,317,466; and U.S. 3,546,165].

It was also surprising to find that relatively small amounts of phenoxyphthalic acids, at least 10 mole percent, when incorporated into aromatic polyesters would enable these polymers to process at temperatures significantly below those of wholly aromatic polyesters which do not contain phenoxy groups, and still exhibit the highly advantageous physical characteristics associated with wholly aromatic polyesters.

According to one aspect of this invention, there is provided a composition comprising a phenoxyphthalate polyester of (1) at least one aromatic diol or derivatives thereof, and (2) at least 10 mole percent of at least one phenoxyphthalic acid or derivatives thereof having the structure

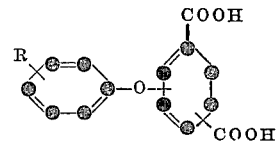

wherein the carboxyl groups are in a position meta or para to each other and R is hydrogen, at least one chlorine atom, bromine atom, phenyl group or alkyl group containing one to four carbon atoms.

In a preferred embodiment of this invention there is provided the above composition wherein the inherent viscosity of the polyester is at least 0.3, and even more preferably at least 0.5.

In an especially preferred embodiment of this invention the foregoing objects are accomplished by providing a composition wherein the phenoxyphthalic acid is 5-phenoxyisophthalic acid.

The term "phenoxyphthalic acid or derivatives thereof" includes, of course, the various condensable derivatives of the acids such as aryl esters, lower alkyl esters, anhydrides, halides, etc., which may be employed in such reactions with diol components of the condensable derivatives to prepare polyesters. The term "aromatic diol or derivative" includes the various derivatives of the aromatic diols such as lower alkyl esters which may be employed in such reactions with acid components of the condensable derivatives to prepare polyesters.

The phenoxyphthalate polyester of this invention is derived from at least one aromatic diol (including dihydric phenols). The hydroxyl groups of the aromatic diol may be on the same aromatic ring, or on separate aromatic rings. Examples of aromatic diols which may be used in this invention include hydroquinone, resorcinol, 1,4 - naphthalenediol, catechol, 4,4'- isopropylidenediphenol (also known as bisphenol A.), 4,4'-sulfonyldiphenol, 4,4' - thiodiphenol, 4,4' - oxydiphenol, 4,4'-dihydroxybiphenyl, 4,4' - sulfonylbis(2,6-dibromophenol), 4,4' - (2 - norbornylidene)diphenol, 2,6 - naphthalenediol, 4,4' - isopropylidenebis(2,6-dichlorophenol), and other dihydric phenols listed in U. S. Pats. 3,030,335 and 3,317,466.

The phenoxyphthalate polyester of this invention is derived from at least 10 mole percent and preferably at least 20 mole percent of at least one phenoxyphthalic acid. While 5-phenoxyisophthalic acid is preferred, especially advantageous results are obtained with other phenoxyphthalic acids. Examples include 4-phenoxyisophthalic acid, phenoxyterephthalic acid, 5 - (o- chlorophenoxy)isophthalic acid, 5 - (p-methylphenoxy) isophthalic acid, and (p-bromophenoxy)terephthalic acid.

Up to 90 mole percent of a second dicarboxylic acid can be used to modify the polymer. This modifier may be an aliphatic dicarboxylic acid containing 2–40 carbon atoms or an aromatic dicarboxylic acid containing 8–40 carbon atoms. The aromatic dicarboxylic acids are preferred, (e.g., terephthalic acid, isophthalic acid, 4,4'-sulfonyldibenzoic acid, 4,4' - benzophenonedicarboxylic acid, 4,4' - methylenedibenzoic acid, 4,4' - oxydibenzoic acid, 4,4' - biphenyldibenzoic acid, naphthalenedicarboxylic acids, 5-tert-butylisophthalic acid, diphenic acid, chloroterephthalic acids, and dichloroterephthalic acid. More than one aromatic dicarboxylic acid may be used. The polyesters of this invention may also be modified with aromatic hydroxy acids such as p-hydroxybenzoic acid, m-hydroxybenzoic acid, the various naphthalenehydroxycarboxylic acids and the like.

The phenoxyphthalate polyesters of this invention can be prepared by ester exchange of the aromatic diols with the diaryl esters of the aromatic dicarboxylic acids. Experimental details are described in various literature and patent references, such as U.S. Pat. 3,220,977. The polyester may also be prepared from the aromatic diols and aromatic dicarboxylic acid chlorides by heating in suitable high-boiling solvents such as chlorinated biphenyl, as described in U.S. Pat. 3,036,990, or by the interfacial polycondensation of the aromatic diol and aromatic dicarboxylic acid chlorides in an aqueous alkaline medium as described in U.S. Pat. 3,216,970. A preferred preparative method consists of heating the free aromatic dicarboxylic acids and monocarboxylic acid esters of the aromatic diol, e.g., hydroquinone diacetate. This process is described in U.S. Pat. 3,317,464. Polymers melting above 300° C. are preferably built up in the solid phase from prepolymers prepared in the melt.

A typical polymerization of a phenoxyphthalate polyester is as follows:

A mixture of 0.1 mole of the phenoxyphthalic acid and 0.1 mole of the diacetate of an aromatic diol is placed in a 250-ml. flask equipped with a stirrer and a short head with inlet and outlet for nitrogen. The nitrogen outlet, which is connected to a receiver, has provision for applying vacuum. The flask and contents are evacuated and purged three times with nitrogen and then lowered into a Wood's-metal bath maintained at 200° C. A slow nitrogen sweep is used to prevent the reaction mixture from contacting air. Stirring is started and the temperature is raised to 260° C. over a period of 15 min. Acetic acid slowly distills from the flask, and elimination of the acetic acid is practically complete after 60 min. The temperature of the bath is then increased to 350° C. and held for 10–15 min. Vacuum is gradually applied (to approximately 0.5 mm.) during 5 min. After 20 min. a polymer with an inherent viscosity of at least 0.5 is generally obtained.

In an alternate procedure the vacuum is applied to the reaction mixture at 260° C. instead of 350° C. and polymerization continued until the product solidifies. This prepolymer is then granulated to pass a 20-mesh screen and built up to an inherent viscosity of at least 0.5 by heating at 280° C. and 0.5 mm. for several hours.

Phenoxyphthalate polyesters which contain no aliphatic groups are of particular interest because of their high thermal and oxidative stability, advantageous glass transition temperature, and high oxygen indices. It is known that polyesters of aromatic diols and aromatic dicarboxylic acids generally have high melting points and, therefore, are very difficult to process. The phenoxyphthalate polyesters of this invention, however, process at temperatures significantly below those of wholly aromatic polyesters which do not contain phenoxy groups and still exhibit the highly advantageous physical characteristics associated with wholly aromatic polyesters.

The polyester of hydroquinone and isophthalic acid, for instance, melts at above 400° C. The similar polyester of hydroquinone and 5-phenoxyisophthalic acid, however, melts at 330° C. Consequently, preparation and processing pose no large problems.

The polymers of this invention may be fabricated to give fire-retardant shaped objects, such as plastics, films, fibers, and coatings. They also may be used as hot-melt adhesives for materials which include metals, glass, and ceramic objects.

Processing aids may be incorporated in the polymers to facilitate processing and fabrication. Suitable processing aids include aromatic halogenated hydrocarbons, aromatic esters, and aryl phosphates.

The compositions of this invention also may contain nucleating agents, fillers, pigments, glass fibers, asbestos fibers, antioxidants, stabilizers, plasticizers, lubricants, and other additives.

This invention may be more fully understood by reference to the following illustrative examples.

Physical properties of injection molded test bars are determined according to standard ASTM methods.

The polyesters of this invention are injection molded in a Watson-Stillman one-ounce injection molding press to give 1/16-inch tensile bars and 1/8-inch flexure bars. Heat-distortion temperatures of the flexure bars are determined at a load of 264 p.s.i. in a forced air oven (deflection corresponding to the strain in ASTM D648).

Glass transition temperatures ($T_g$) are determined with a differential scanning calorimeter by standard methods.

An important attribute of the polymers of this invention is their self-extinguishing character. A quantitative determination of the fire resistance is the oxygen index. Generally, thin specimens have lower oxygen indices than thicker pieces, such as 1/8-inch thick molded tests bars and, consequently, the thinner test specimens are more likely to burn. We have observed that a film with an oxygen of at least 26 generally is self-extinguishing after removal of the ignition source. All of the pressed films and molded bars of the examples have oxygen indices of at least 26 and are self-extinguishing. Oxygen indices of molded bars are determined according to ASTM D–2863–70. Oxygen indices of knitted fabrics and 20-mil films are similarly determined while supported in a 1¾ x 5 inch metal frame open at the top; to prevent dripping, the film or fabric is sewed with three vertical rows ¼-inch apart of double stitched glass threads. ASTM procedures are used for measuring tensile strength and elongation (ASTM D1708), flexural modulus (ASTM D790), and notched Izod impact strength (ASTM D256, Method A). All inherent viscosities (I.V.) are determined at 25° C. in 60/40 phenol/tetrachloroethane at a concentration of 0.23 g. polymer/100 ml. solvent.

EXAMPLE 1

A polyester is prepared from 5-phenoxyisophthalic acid and the diacetate of 4,4'-isopropylidenediphenol (bisphenol A). The polymer has an I.V. of 0.53, a $T_g$ of 162 C., and is non-crystalline. A pressed 20-mil film has an oxygen index of 26. Bars injection-molded at 350° C. have the following properties: tensile strength 10,000 p.s.i., elongation 45%, flexural modulus $3.5 \times 10^5$ p.s.i., heat-distortion temperature 159° C., and oxygen index 42.

The similar polyester prepared with isophthalic acid instead of 5-phenoxyisophthalic acid has a $T_g$ of 181° C. Consequently, it has a higher melt viscosity than the above phenoxyisophthalic polymer ($T_g$ 162° C.) and is more difficult to injection mold.

EXAMPLE 2

A polyester is prepared from 5-phenoxyisophthalic acid and hydroquinone diacetate. The polymer has an I.V. of 0.55, a $T_g$ of 140° C., and a melting point of 330° C. after solid-phase build-up. A pressed 20-mil film has an oxygen index of 31. Injection-molded bars have the following properties: tensile strength 11,000 p.s.i., elongation 41%, flexural modulus $3.7 \times 10^5$ p.s.i., notched Izod impact strength 1.9 ft.-lb./in. of notch, heat-distortion temperature 143° C., and oxygen index 45.

The similar polyester prepared with isophthalic acid instead of 5-phenoxyisophthalic acid has a melting point above 400° C. Consequently, we cannot injection-mold the polymer (maximum temperature capability of our injection-molding machines is 400° C.).

EXAMPLE 3

A copolyester is prepared from 80 mole percent of 5-phenoxyisophthalic acid, 20 mole percent of terephthalic acid, and hydroquinone diacetate. The polymer has an I.V. of 0.52, a $T_g$ of 142° C., and a melting point of 220° C. A pressed 20-mil film has an oxygen index of 30. Injection-molded bars have the following properties: tensile strength 10,700 p.s.i., elongation 45%, flexural modulus $3.5 \times 10^5$ p.s.i., heat-distortion temperature 146° C., and oxygen index 43.

The similar copolyester prepared from 80 mole percent of isophthalic acid, 20 mole percent of terephthalic acid, and hydroquinone diacetate has a melting point of 400° C. after solid-phase buildup. Because of the high melting point, we cannot injection-mold the polymer.

EXAMPLE 4

A copolyester is prepared from 80 mole percent of isophthalic acid, 20 mole percent of 5-phenoxyisophthalic acid, and hydroquinone diacetate. The polymer has an I.V. of 0.48, a $T_g$ of 163° C., and a melting point of 312° C. after solid-phase build-up. Injection-molded bars have the following properties: tensile strength 10,700 p.s.i., elongation 66%, flexural modulus $3.2 \times 10^5$ p.s.i., heat-distortion temperature 155° C., and oxygen index 44.

EXAMPLE 5

A polyester is prepared from phenoxyterephthalic acid and the diacetate of 4,4'-oxydiphenol. The noncrystalline polymer has an I.V. of 0.57, a $T_g$ of 140° C., and an oxygen index of 34 on a 20-mil pressed film.

EXAMPLE 6

A polyester is prepared from 5-(o-chlorophenoxy)isophthalic acid and the diacetate of 4,4'-dihydroxybiphenyl. The polymer is noncrystalline and has an I.V. of 0.54, a $T_g$ of 170° C., and an oxygen index of 37 on a 20-mil pressed film.

EXAMPLE 7

A polyester is prepared from 4-phenoxyisophthalic acid and the diacetate of 4,4'-sulfonyldiphenol. The polymer is noncrystalline and has an I.V. of 0.46, a $T_g$ of 180° C., and an oxygen index of 34 on a 20-mil pressed film.

EXAMPLE 8

A copolyester is prepared from 75 mole percent of isophthalic acid, 25 mole percent of 5-phenoxyisoophthalic acid, and hydroquinone diacetate. The polymer has an I.V. of 0.55, a $T_g$ of 160° C., and a melting point of 318° C. after solid-phase build-up. After being melt-spun at 360° C., the fibers have the following properties: tenacity 2.0 grams per denier, elongation 59%, and modulus 34 grams per denier. A knitted sock has an oxygen index of 35.

Although the invention has been described in detail with particular reference to the preferred embodiments thereof, it will be understood that variations and modifications can be effected within the spirit and scope of the invention.

We claim:

1. Composition consisting essentially of a fiber and film forming phenoxyphthalate polyester of (1) at least one aromatic diol or a lower alkyl ester derivative thereof (2) at least 10 mole percent of at least one phenoxyphthalic acid or ester forming derivatives thereof having the structure

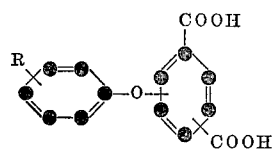

wherein the carboxyl groups are in a position meta or para to each other and R is hydrogen, at least one chlorine atom, bromine atom or alkyl group containing one to four carbon atoms; and (3) 0 to 90 mole percent of at least one other aromatic dicarboxylic acid or ester forming derivatives thereof.

2. The composition of claim 1 having an inherent viscosity of at least 0.3 as measured at 25° C. using 0.23 gram of polyester per 100 ml. of a solvent consisting of 60 percent by weight phenol and 40 percent by weight tetrachloroethane.

3. The composition of claim 2 wherein the aromatic diol is selected from
   (a) hydroquinone,
   (b) resorcinol,
   (c) 4,4'-isopropylidenediphenol,
   (d) 4,4'-oxydiphenol,
   (e) 4,4'-dihydroxybiphenyl,
   (f) 4,4'-sulfonyldiphenol, or
   (g) a lower alkyl ester derivatives thereof;

the phenoxyphthalic acid is selected from
   (a) 5-phenoxyisophthalic acid,
   (b) 4-phenoxyisophthalic acid,
   (c) phenoxyterephthalic acid,
   (d) 5-(o-chlorophenoxy)isophthalic acid, or
   (e) ester forming derivatives thereof;

and the aromatic dicarboxylic acid is selected from
   (a) terephthalic acid,
   (b) isophthalic acid,
   (c) naphthalenedicarboxylic acid,
   (d) 4,4'-sulfonyldibenzoic acid, or
   (e) ester forming derivatives thereof.

4. The composition of claim 2 wherein the phenoxyphthalic acid is 5-phenoxyisophthalic acid.

5. A shaped article of a composition as defined by claim 1.

6. A shaped article of a composition as defined by claim 2.

7. A shaped article of a composition as defined by claim 3.

8. The shaped article of claim 5 in the form of a pellet.

9. A fiber of the composition of claim 1.

10. A fiber of the composition of claim 2.

References Cited

UNITED STATES PATENTS 2,902,469  9/1959  Burkhard _____ 260—47
3,160,605  12/1964  Kantor et al. _____ 260—47

WILLIAM H. SHORT, Primary Examiner

L. L. LEE, Assistant Examiner

U.S. Cl. X.R.

117—161 K; 161—194, 205; 260—33.4 P, 33.8 R, 40 R, 40 P